United States Patent
Chung et al.

(10) Patent No.: US 9,524,046 B2
(45) Date of Patent: Dec. 20, 2016

(54) METHOD FOR MANUFACTURING HYBRID TRANSPARENT ELECTRODE AND HYBRID TRANSPARENT ELECTRODE

(71) Applicant: INKTEC CO., LTD., Ansan-si, Gyeonggi-do (KR)

(72) Inventors: Kwang-Choon Chung, Yongin-si (KR); In-Sook Yi, Siheung-si (KR); Ji Hoon Yoo, Bucheon-si (KR); Joonki Seong, Anyang-si (KR); Dae sang Han, Seoul (KR)

(73) Assignee: INKTEC CO., LTD., Ansan-Si, Gyeonggi-Do (KR)

( * ) Notice: Subject to any disclaimer, the term of this patent is extended or adjusted under 35 U.S.C. 154(b) by 0 days.

(21) Appl. No.: 14/891,448

(22) PCT Filed: May 16, 2014

(86) PCT No.: PCT/KR2014/004432
§ 371 (c)(1),
(2) Date: Jan. 27, 2016

(87) PCT Pub. No.: WO2014/185756
PCT Pub. Date: Nov. 20, 2014

(65) Prior Publication Data
US 2016/0132141 A1    May 12, 2016

(30) Foreign Application Priority Data
May 16, 2013    (KR) .................. 10-2013-0056030

(51) Int. Cl.
G06F 3/041 (2006.01)
G06F 3/044 (2006.01)

(52) U.S. Cl.
CPC ............. *G06F 3/041* (2013.01); *G06F 3/044* (2013.01); *G06F 2203/04103* (2013.01)

(58) Field of Classification Search
CPC ........ G03F 3/041; G03F 3/044; G03F 3/03545; G03F 3/0488
See application file for complete search history.

(56) References Cited

U.S. PATENT DOCUMENTS 6,051,448 A * 4/2000 Hayama ............ H01F 41/043
                                                    438/108
6,420,032 B1    7/2002 Iacovangelo
(Continued)

FOREIGN PATENT DOCUMENTS

JP    2007243192    9/2007
JP    2008277202    11/2008
(Continued)

OTHER PUBLICATIONS

International Search Report to corresponding PCT application, PCT/KR2014/004432, dated Aug. 26, 2014.

*Primary Examiner* — Duy Deo
(74) *Attorney, Agent, or Firm* — Cooper Legal Group, LLC

(57) ABSTRACT

Provided herein is a method for producing a hybrid transparent electrode, the method including filling grooves of a substrate with a conductive metal ink composition; filling the grooves with residue conductive metal ink composition that remains on a surface of the substrate as the grooves are being filled with the conductive metal ink composition to form an electrode pattern; and forming a conductive layer including a conductive material on the electrode pattern.

26 Claims, 6 Drawing Sheets

(56) References Cited

U.S. PATENT DOCUMENTS

| | | | | |
|---|---|---|---|---|
| 2007/0128905 A1* | 6/2007 | Speakman | ........... | H05K 1/0265 |
| | | | | 439/161 |
| 2011/0309385 A1 | 12/2011 | Nendai | | |
| 2014/0111442 A1* | 4/2014 | Cok | ........................ | G06F 3/044 |
| | | | | 345/173 |
| 2014/0199473 A1* | 7/2014 | Van Lammeren | .. | H01L 51/0022 |
| | | | | 427/98.4 |

FOREIGN PATENT DOCUMENTS

| KR | 1020060108875 | 10/2006 |
|---|---|---|
| KR | 1020100104830 | 7/2011 |
| KR | 1020110100034 | 9/2011 |
| KR | 1020120064648 | 6/2012 |
| KR | 1020130021170 | 3/2013 |

\* cited by examiner (a)

(b)

(c)

(d)

(e)

(f)

(g)

| | Cross-section #1 | Cross-section #2 |
|---|---|---|
| COMPARATIVE EXAMPLE 1 |  |  |
| EXAMPLE 1 |  |  |
| EXAMPLE 2 |  |  |
| EXAMPLE 3 |  |  |
| EXAMPLE 4 |  |  |
| EXAMPLE 5 |  |  |

METHOD FOR MANUFACTURING HYBRID TRANSPARENT ELECTRODE AND HYBRID TRANSPARENT ELECTRODE

FIELD

The present invention relates to a method for producing a hybrid transparent electrode and the hybrid transparent electrode, and more particularly, to a method for producing a hybrid type transparent electrode having a conductive layer formed on a fine metal electrode pattern.

BACKGROUND

As electronic devices such as displays and transistors are required to be manufactured in high density and high integrated formats due to the trend of lighter and simpler electronic devices, techniques for forming fine metal patterns that may be used in electrodes or metallization are drawing interest.

Especially, of the techniques of manufacturing transparent electrodes that are essential in touch panels, a metal pattern formed by forming a fine pattern on a substrate and filling it with a metal conductive ink is very useful in terms of resistance properties. Furthermore, metal-based transparent electrodes (TCF) having improved optical characteristics and electrical characteristics due to metal nanowires or various types of metal structures coated on the substrate film are being developed.

However, an electrode surface made of such materials is not suitable to OLED or other display processes that require several tens of nano levels of surface flatness, and due to the difference of work function from organic materials formed on top of the electrode, the energy barrier may increase.

Currently, for transparent electrodes for use in touch panels and displays, oxide transparent electrodes including ITO (Indium Tin Oxide) are commercialized, but the reserves of oxide transparent electrodes is limited, and oxides lack flexibility and has resistance characteristics that are not as excellent as metal, and thus it is difficult to use oxide transparent electrodes in large scale flexible displays.

With the recent increase of needs for large scale flexible displays, it is urgently necessary to develop an electrode material having excellent resistance characteristics, flexibility, compatibility with organic materials, and surface flatness.

SUMMARY

A purpose of the present invention is to resolve the aforementioned problems of conventional techniques, that is, to provide a method for producing a dual-layered hybrid transparent electrode by hybridizing a conductive metal ink composition having mechanical and electrical characteristics with an oxide electrode having excellent surface characteristics.

Another purpose of the present invention is to provide a method for producing a hybrid transparent electrode using a metal complex compound or metal precursor, thereby forming a hybrid transparent electrode having reduced resistance while maintaining excellent electric properties.

Another purpose of the present invention is to provide a method for producing a hybrid transparent electrode by printing a fine electrode pattern using a conductive metal ink composition while removing residue of the conductive metal ink composition from areas besides the fine pattern area, so that the fine pattern has low resistance and excellent transmittance that had been difficult to be implemented according to conventional techniques.

Another purpose of the present invention is to provide a method for producing a hybrid transparent electrode wherein mechanical characteristics may be improved by adjusting the thickness of the conductive layer, and surface characteristics and mechanical characteristics may be improved by maximizing the filling of conductive ink inside the metal electrode pattern and adopting a polymer layer between the oxide electrodes.

According to an aspect of the present invention, there is provided a method for forming a hybrid transparent electrode, the method comprising filling grooves of a substrate with a conductive metal ink composition; filling the grooves with residue conductive metal ink composition that remains on a surface of the substrate as the grooves are being filled with the residue conductive metal ink composition to form an electrode pattern; and forming a conductive layer comprising a conductive material on the electrode pattern.

The conductive metal ink composition may comprise at least one of a metal complex compound, metal precursor, spherical metal particles, metal flakes, nano particles and nano wires.

The filling the grooves with the conductive metal ink composition may be performed by an inkjet method, flat panel screen method, spin coating method, bar coater method, roll coating method, flow coating method, doctor blade, dispensing, gravure printing method or flexo printing method.

The filling the grooves with the residue conductive metal ink composition may include dissolving the residue conductive metal ink composition that remains on the surface as the grooves are being filled with the conductive metal ink composition by an etching solution so that the grooves may be filled with the dissolved residue conductive metal ink composition.

The etching solution may be applied on the substrate surface and dissolves the residue conductive metal ink composition.

The etching solution may be applied on the entire surface of the substrate by a flat panel screen method, spin coating method, roll coating method, flow coating method, doctor blade, gravure printing method, or flexo printing method.

The etching solution may comprise at least one of an ammonium carbamate compound, ammonium carbonate compound, ammonium bicarbonate compound, carboxylic acid compound, lactone compound, lactam compound, cyclic acid anhydride compound, acid-base complex, acid-base-alcoholic complex and mercapto compound, and an oxidizing agent.

The grooves may be filled with the residue conductive metal ink composition by pushing the residue conductive metal ink composition dissolved by the etching solution into the grooves.

The residue conductive metal ink composition dissolved by the etching solution may be pushed into the grooves using a doctor blade or brush.

The conductive material may be a metal oxide, CNT, graphene, or conductive polymer.

The conductive layer may be formed by depositing or printing the conductive material on the electron pattern.

The thickness of the conductive layer may be 0.5 to 2.0 times the height of the groove.

According to another aspect of the present invention, there is provided a method for forming a hybrid transparent electrode, the method comprising plasma treating a surface of a substrate having grooves on its surface to have a hydrophobic property; filling the grooves with a conductive metal ink composition; filling the grooves with residue conductive metal ink composition that remains on the surface of the substrate as the grooves are being filled with the conductive metal ink composition to form an electrode pattern; and forming a conductive layer including a conductive material on the electrode pattern.

The conductive metal ink composition may comprise at least one of a metal complex compound, metal precursor, spherical metal particles, metal flakes, nano particles and nano wires.

The filling the grooves with residue conductive metal ink composition may include dissolving the residue conductive metal ink composition that remains on the surface as the grooves are being filled with the conductive metal ink composition by an etching solution so that the grooves may be filled with the dissolved residue conductive metal ink composition.

The grooves may be filled with the residue conductive metal ink composition as the residue conductive metal ink composition dissolved by the etching solution is pushed into the grooves using a doctor blade or brush.

The conductive layer may be formed by depositing or printing a metal oxide, CNT, graphene, or conductive polymer on the electron pattern.

According to another aspect of the present invention, there is provided a method for forming a hybrid transparent electrode, the method comprising a first filling with a conductive metal ink composition that includes preparing a substrate having grooves on its surface and filling the grooves with the conductive metal ink composition; a first filling with a residue conductive metal ink composition that includes filling the grooves with the residue conductive metal ink composition that remains on the surface of the substrate as the grooves are being filled with the conductive metal ink composition to form an electrode pattern; a second filling with a conductive metal ink composition that involves filling the grooves with the conductive metal ink composition; a second filling with a residue conductive metal ink composition that includes filling the grooves with the residue conductive metal ink composition that remains on the surface as the grooves are being filled with the conductive metal ink composition to form an electrode pattern; and forming a conductive layer including a conductive material on the electrode pattern.

The conductive metal ink composition may comprise at least one of a metal complex compound, metal precursor, spherical metal particles, metal flakes, nano particles and nano wires.

The metal precursor may be $M_nX$, M being one of Ag, Au, Cu, Ni, Co, Pd, Ti, V, Mn, Fe, Cr, Zr, Nb, Mo, W, Ru, Cd, Ta, Re, Os, Ir, Al, Ga, Ge, In, Sn, Sb, Pb and Bi, n being an integer of 1 to 10, X being one of oxygen, sulfur, halogen, cyano, cyanate, carbonate, nitrate, sulfate, phosphate, thiocyanate, chlorate, perchlorate, tetrafluoroborate, acetylacetonate, mercapto, amide, alkoxide, or carboxylate.

The conductive layer may be formed by depositing or printing the conductive material on the electron pattern.

The conductive layer may be formed to have a thickness of 10 to 500 nm.

According to another aspect of the present invention, there is provided a method for forming a hybrid transparent electrode, the method comprising filling grooves of a substrate with a conductive metal ink composition after preparing the substrate having the grooves on its surface; filling the grooves with residue conductive metal ink composition that remains on a surface of the substrate as the grooves are being filled with the conductive metal ink composition to form an electrode pattern; sintering the electrode pattern at an atmosphere of 50 to 200° C.; and forming a conductive layer comprising a conductive material on the electrode pattern.

The step of filling the grooves with residue conductive metal ink composition may be repeated twice or more times.

The filling the grooves with residue conductive metal ink composition may involve dissolving the residue conductive metal ink composition that remains on the surface as the grooves are being filled with the conductive metal ink composition by an etching solution so that the grooves may be filled with the dissolved residue conductive metal ink composition.

The filling the grooves with the conductive metal ink composition may be performed by an inkjet method, flat panel screen method, screen coating method, bar coater method, roll coating method, flow coating method, doctor blade, dispensing, gravure printing method or flexo printing method.

According to another aspect of the present invention, there is provided a hybrid transparent electrode including a substrate having grooves formed in a mesh format; a metal mesh electrode prepared by filling the grooves with a conductive metal ink composition; and a metal oxide layer formed on the metal mesh electrode.

The conductive metal ink composition may comprise at least one of a metal complex compound, metal precursor, spherical metal particles, metal flakes, nano particles and nano wires.

The metal oxide layer may comprise tin oxide, indium tin oxide, antimony tin oxide, indium gallium oxide, indium zinc oxide, or zinc oxide.

The present invention may form an electrode pattern with a conductive metal ink composition, and form a conductive layer made of a conductive material on the electrode pattern, thereby producing a hybrid type transparent electrode with excellent electric conductivity and transmittance optimized to transparent electrodes.

Especially, due to excellent interface characteristics between two electrodes, the transparent electrode of the present invention may be applied to fields requiring high conductivity and reliability.

Not only that, with an improved flexibility compared to a conventional hybrid transparent electrode, the transparent electrode of the present invention may be easily applied to a flexible display.

By using a conductive material comprising a metal complex compound or metal precursor to form a fine electrode pattern, it is possible to improve optical, electrical, and mechanical characteristics at the same time.

By dissolving a residue metal composition that inevitably occurred while filling the grooves of the substrate with the conductive metal ink composition to form an electrode pattern using an etching solution and pushing the dissolved residue metal composition into the grooves, it is possible to improve the flatness of the electrode surface and improve the transmittance and withstanding voltage.

Using a blade or brush to manage the residue conductive metal ink composition that remains on the substrate surface, it is possible to significantly improve the filling rate of the conductive metal ink composition on the electrode surface without damaging the substrate surface and filled electrode.

The effects of the present invention are not limited to the aforementioned effects, and other effects will be apparent for one skilled in the art from the description in the claims.

REFERENCE NUMERALS IN DRAWINGS

Figure 1:
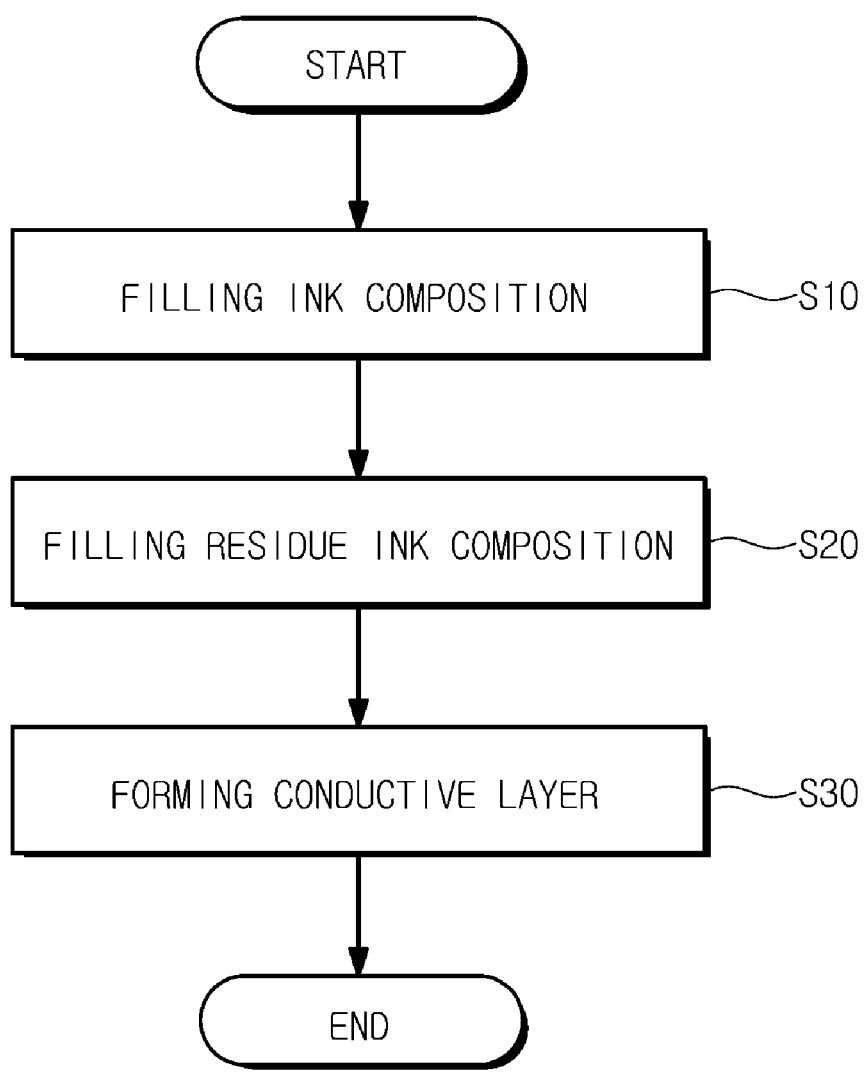
FIG. 1 is a flowchart sequentially showing a method for producing a hybrid transparent electrode according to an embodiment of the present invention.

1: SUBSTRATE
2: FILM
3: GROOVE
4, 6: CONDUCTIVE METAL INK COMPOSITION
5: RESIDUE CONDUCTIVE METAL INK COMPOSITION
7: DOCTOR BLADE
8: ETCHING SOLUTION
9: BRUSH
10: DISSOLVED RESIDUE CONDUCTIVE METAL INK COMPOSITION
11: CONDUCTIVE LAYER

DETAILED DESCRIPTION

The advantages and features of the present invention, and methods for achieving those advantages and features will be apparent with reference to the following embodiments described in detail hereinafter. However, the present invention is not to be construed as limited to the following embodiments, but may be realized in a variety of configurations. Therefore, the following embodiments are merely intended to provide a scope of the present invention for one skilled in the art, and the present invention is to be defined within the scope of the claims. Like reference numerals refer to the same components through the specification.

Unless defined otherwise, all terms (including technical and scientific terms) in the present specification may indicate meanings that may be commonly understood by those skilled in the related art. Furthermore, the terms defined in commonly used dictionaries are not to be construed idealistically or excessively unless clearly and especially defined otherwise.

Thickness and size of each component in the drawings are exaggerated, omitted or schematically illustrated for the sake of clear and easy illustration. Furthermore, the size and area of each component do not necessarily reflect the actual size and area, either.

Hereinafter, the present invention will be explained based on the drawings for explaining a method for producing a hybrid transparent electrode according to embodiments of the present invention.

As illustrated in FIG. 1, a method for producing a hybrid transparent electrode according to an embodiment of the present invention comprises filling an ink composition (S10), filling a residue ink composition (S20) and forming a conductive layer (S30).

Filling Ink Composition (S10)

The step of filling an ink composition (S10) is a step of filling grooves of a substrate with a conductive metal ink composition, that is, filling intaglio grooves with a material having conductivity.

Prior to forming a conductive pattern using the conductive metal ink composition, it is desirable to perform a surface treatment on an upper surface of the substrate.

Prior to forming grooves on the substrate, the surface of the substrate may be treated to be hydrophobic.

By such surface treatment, it is possible to manage the conductive metal ink composition to be explained hereinafter more easily. The aforementioned hydrophobic treatment of the surface of the substrate may be possible by treating the upper surface of the substrate with plasma.

There is no particular limitation to the type of the substrate. The substrate may be made of a transparent material, for example, plastic film or glass. Examples of the plastic films that may be used herein include polyimide (PI), polyethyleneterephthalate (PET), polyethylenenaphthalate (PEN), polyethersulfone (PES), nylon, polytetrafluoroethylene (PTFE), polyetheretherketone (PEEK), polycarbonate (PC), and polyarylate (PAR). Opaque materials may be used instead. For example, a metal plate of which the surface has been insulated may be used, or an opaque plastic film, opaque glass or opaque glass fiber material may be applied. As such, a plastic film or glass substrate may be used, but without limitation.

The grooves on the substrate may be formed by a method commonly used in the related art, and desirably a method of imprinting a UV curable resin or thermosetting resin with a mold to form grooves, a method of etching the substrate directly with laser to form grooves, or a method of forming grooves using a photolithography. A suitable method among them may be selected depending on the size of the fine line width to be realized.

Examples of the conductive metal ink composition that may be used herein comprise a metal complex compound, metal precursor, spherical metal particles, metal flakes, nano particles, nano wire, and a mixture of two or more thereof depending on the conductive material.

In order to improve the filling characteristics of the fine grooves, a metal complex compound or metal precursor may be used. Furthermore, a metal complex compound or metal precursor may be reduced to nano size metal particles, and be used as a combination. By doing this, it is possible to easily form a fine electrode pattern in nano size that could not have been formed according to conventional techniques.

The metal precursor that may be used herein is expressed as $M_nX$, wherein M is Ag, Au, Cu, Ni, Co, Pd, Ti, V, Mn, Fe, Cr, Zr, Nb, Mo, W, Ru, Cd, Ta, Re, Os, Ir, Al, Ga, Ge, In, Sn, Sb, Pb, or Bi; n is an integer between 1 and 10; and X represents oxygen, sulfur, halogen, cyano, cyanate, carbonate, nitrate, sulfate, phosphate, thiocyanate, chlorate, perchlorate, tetrafluoroborate, acetylacetonate, mercapto, amide, alkoxide, or carboxylate.

For example, one or more of the following may be selected and used: metal carboxylate such as gold acetate, palladium oxalate, 2-ethyl hexanoic acid silver, 2-ethyl hexanoic acid copper, iron stearate, nickel formate, and zinc citrate; a metal compound such as silver nitrate, copper cyanate, cobalt carbonate, platinum chloride, gold chloride, tetrabutoxy titanium, dimethoxyzirconium dichloride, aluminum isopropoxide, vanadium oxide, tantalum methoxide, bismuth acetate, dodecyl mercapto gold, and indium acethylacetonate.

General methods for producing metal nano particles include physical methods of physically pulverizing a metal lump, and chemical producing methods. More specifically, chemical methods include an aerosol method of spraying high-pressure gas for pulverization, pyrolysis method using a metal compound and a gas reductant for pyrolysis pulverization, evaporation-condensation method of heating and evaporating a subject material for pulverization, sol gel method, hydrothermal synthesis method, ultrasonic wave synthesis method, micro emulsion method, and liquid reduction method.

The liquid reduction method is most widely used since it is regarded as easily forming and controlling nano particles and as most economical, but in the present invention, any method can be used as long as it forms nano particles.

A method for producing nano particles in a liquid reduction method is specifically explained in Korean Patent Application no. 2006-0074246 filed by the same applicant as the present invention. Advantages of Korean Patent Application no. 2006-0074246 include that the size of particles are uniform and their cohesiveness is minimized, and that it is possible to form a uniform and dense thin film or fine pattern having a high conductivity even when plasticized for a short period of time under a low temperature of 150° C. or less.

Besides these components, additives such as a solvent, stabilizer, dispersant, binder resin, releasing agent, reductant, surfactant, wetting agent, thixotropic agent, leveling agent, or thickening agent may be further included when necessary.

It is desirable that the binder resin has an excellent adhesive force with various substrates. Examples of organic polymer materials that may be used as the binder resin include polypropylene, poly carbonate, polyacrylate, polymethylmethacrylate, celluloseacetate, polyvinylchloride, polyurethane, polyester, alkyd resin, epoxy resin, phenoxy resin, melamine resin, phenol resin, phenol-modified alkyd resin, epoxy-modified alkyd resin, vinyl-modified alkyd resin, silicon-modified alkyd resin, acryl melamine resin, polyisocyanate resin, and epoxy ester resin, but without limitation.

With regard to the conductive metal ink composition used at the step of filling an ink composition (S10), Ag complex compound or nano particles may be used even when there is no binder, and thus there is no limitation thereto.

Furthermore, there are cases where a solvent is necessary in order to form a uniform thin film. Examples of the solvent that may be used include alcohols such as ethanol, isopropanol, butanol, and hexanol; glycols group such as ethyleneglycol and glycerin; acetates such as ethylacetate, butylacetate, methoxypropylacetate, carbitolacetate, and ethylcarbitolacetate; ethers such as methylcellosolve, butylcellosolve, diethylether, tetrahydrofuran, and dioxane; ketones such as methylethylketone, acetone, dimethylformamide, and 1-methyl-2-pyrolidone; hydrocarbons such as hexane, heptane, dodecane, paraffin oil, and mineral spirit; aromatics such as benzene, toluene, and xylene; halogen substituted solvents such as chloroform, methylenechloride, and carbontetrachloride; acetonitrile; dimethylsulfoxide; and a combination thereof, but without limitation.

At the step of filling the ink composition (S10), there is no limitation to the method for filling grooves of the substrate with the conductive metal ink composition, but an inkjet method, flat panel screen method, spin coating method, bar coater method, roll coating method, flow coating method, doctor blade method, dispensing, gravure printing method and flexography printing method are desirable.

Herein, the filling may be performed once or more. The filling characteristics may vary depending on the filling method, but it is necessary to optimize the rheology of the composition to each filling method by adjusting the components of the conductive metal ink composition according to each method.

The thickness of the conductive pattern formed by the aforementioned method may desirably be the same or smaller than the pattern depth of the intaglio, but without limitation.

Depending on subsequent processing conditions, it may be better that the thickness of a conductive pattern is greater than the depth of the intaglio pattern, thereby increasing the bonding force with an upper circuit. More specifically, it is desirably that the thickness is less than 10 μm, more desirably 0.1 μm to 5 μm. The thickness of the conductive pattern needs to be adjusted according to the line width, required resistance and subsequent processing conditions to be realized.

At the step of filling the ink composition (S10), it is desirable to perform a drying step after filling the grooves of the substrate with the conductive metal ink composition.

Drying the conductive pattern may be performed at 22 to 600° C., more desirably 80 to 400° C. There is no particular limitation to such a temperature range, and depending on the type of the substrate, it may be desirable to dry the conductive pattern within a temperature range where the substrate will not be transformed.

The step of filling the ink composition (S10) may be conducted repeatedly two or more times, and the number of times of performing the step of filling the ink composition (S10) may be adjusted suitably depending on the width or height of the grooves or the performance of the conductive metal ink composition.

Filling Residue Ink Composition (S20)

The step of filling residue ink composition (S20) is a step of managing the residue conductive metal ink composition remaining on the surface as the grooves are being filled with the conductive metal ink composition to form an electrode pattern.

It is desirable that the residue conductive metal ink composition is dissolved by an etching solution and filled into the grooves.

The residue conductive metal ink composition inevitably remaining on the substrate surface as the conductive metal ink composition is being filled into the grooves at the step of filling the ink composition (S10) is dissolved by the etching solution, and then filled into the grooves.

The etching mechanism of the conductive metal ink composition may be conducted generally as an oxide oxidizes the metal surface to form a metal oxide, and then the metal oxide being dissolved using a compound for dissolving the metal oxide, followed by a swelling process.

In order to dissolve the residue conductive metal ink composition remaining on the substrate surface, an etching solution may be applied on the substrate surface. The applying the etching solution may be performed by a general coating method.

The etching solution may desirably comprise at least one of an ammonium carbamate compound, ammonium carbonate compound, ammonium bicarbonate compound, carboxylic acid compound, lactone compound, lactam compound, cyclic acid anhydride compound, acid-base complex compound, acid-base-alcoholic complex and mercapto compound, and an oxidizing agent.

For example, in the etching solution, the oxidizing agent and one or more of the aforementioned compounds react directly or by using a solvent. The solvent may include water; alcohols such as methanol, propanol, isopropanol, butanol, and ethanol amine; glycols such as ethylene glycol and glycerin; acetates such as ethylacetate, butyl acetate, carbitolacetate; ethers such as diethylether, tetrahydrofuran, and dioxane; ketones such as methylethylketone and acetone; carbohydrates such as hexane, and heptane; aromatics such as benzene and toluene; halogen substituted solvents such as chloroform, methylenechloride, and carbontetrachloride; fluoric solvents such as perfluorocarbon; or a combination thereof may be used. Under a pressurized state such as in a pressure vessel, a fluoric solvent of a low boiling point, or liquefied carbon dioxide may be used. There is no particular limitation to the method for producing an etching solution. That is, any generally well known method for producing an etching solution may be used as long as it is suitable to the purpose of the present invention.

Examples of the oxidizing agent may include an oxidative gases such as oxygen and ozone; peroxides such as hydrogen peroxide, $Na_2O_2$, $KO_2$, $NaBO_3$, $(NH_4)S_2O_8$, $H_2SO_5$, $(CH_3)_3CO_2H$, and $(C_6H_5CO_2)_2$; hyperoxidates such as $HCO_3H$, $CH_3CO_3H$, $CF_3CO_3H$, $C_6H_5CO_3H$, and $m\text{-}ClC_6H_5\text{---}CO_3H$; generally well known oxidative inorganic acids such as nitric acid, sulfuric acid, iodine ($I_2$), $Fe(NO_3)_3$, $Fe_2(SO_4)_3$, $K_3Fe(CN)_6$, $(NH_4)_2Fe(SO_4)_2$, $Ce(NH_4)_4(SO_4)_4$, $NaIO_4$, $KMnO_4$, and $K_2CrO_4$; or metals or nonmetallic compounds. One or more of these oxidizing agents may be used.

Desirably, hydrophilic characteristics may be added to the etching solution to effectively dissolve the residue conductive ink not filled in the groovess but remaining on the surface of the substrate and to improve re-filling into the fine grooves. It is desirable to adjust the extent of hydrophilic property of the etching solution by adjusting the carbon number of the ammonium carbamate compound, ammonium carbonate compound, ammonium bicarbonate compound, carboxylic acid compound, lactone compound, lactam compound, cyclic acid anhydride compound, acid-base complex compound, acid-base-alcoholic complex, and mercapto compound.

Herein, the ammonium carbamate compound, ammonium carbonate compound, and ammonium bicarbonate compound are specifically explained in Korean Patent Registration no. 0727466, and examples of the carboxylic acid compound that may be used herein include benzoic acid, oleic acid, propionic acid, malonic acid, hexanoic acid, octanoic acid, decanoic acid, neodecanoic acid, oxalic acid, citric acid, salicylic acid, stearic acid, acrylic acid, succinic acid, adipic acid, glycolic acid, isobutyric acid, and ascorbic acid.

Examples of the lactone compound that may be used herein include β-propiolactone, γ-propiolactone, γ-butyrolactone, γ-thiobutyrolactone, α-methyl-γ-butyrolactone, β-methyl-γ-butyrolactone, γ-valerolactone, γ-caprolactone, γ-octanoiclactone, δ-valerolactone, 1,6-dioxaspiro[4,4]nonane-2,7-dione, α-methylene-γ-butyrolactone, γ-methylene-γ-butyrolactone, ε-caprolactone, lactide, glycolide, tetronic acid, 2(5H)-furanone, β-hydroxy-γ-butyrolactone, mevaloniclactone, 5,6-dihydro-2H-pyran-2-pyran-2-one, 5-valerolactone, ε-caprolactone, γ-caprolactone, γ-octanoic lactone and the like.

Examples of the lactam compound that may be used herein include 2-azetidinone, 2-pyrrolidinone, 5-methoxy-2-pyrrolidinone, 5-methyl-2-pyrrolidinone, N-methylcaprolactam, 2-azacyclononanone, N-acetylcaprolactame and the like.

Examples of the cyclic acid anhydride that may be used herein include itaconic anhydride, succinic anhydride, maleic anhydride, glutaric anhydride, octadecyl succinic anhydride, 2,2-dimethyl succinic anhydride, 2-dodecene-1-ylsuccinic anhydride, hexafluoroglutaric anhydride, 3,3-dimethylglutaric anhydride, 3-ethyl-3-methyl glutaric anhydride, 3,5-diacetyltetrahydropyran-2,4,6-trione, diglycolic anhydride, and the like.

Examples of the mercapto compound that may be used herein include 1-methane thiol, 1-ethane thiol, 2-butane thiol, 1-heptane thiol, 1-octane thiol, 1-decane thiol, 1-hexadecane thiol, thio acetic acid, 6-mercaptohexanoic acid, thio benzoic acid, furfuryl mercaptane, cyclohexanethiol, 11-mercapto-1-undecanol, 2-mercaptoethanol, 3-mercapto-1-propanol, thiosalicylic acid, 1-thioglycerol, 2-naphthalenethiol, methyl-3-mercaptopropionate, γ-mercapto propyltrimethoxysilane and the like, but without limitation. One or more of these compounds may be used.

The etching speed of the aforementioned etching composition may desirably be controlled by adjusting the immersing time in the etching solution during the coating process, or by adjusting the concentration of the oxidizing agent or of the ammonium carbamate compound, ammonium carbonate compound, ammonium bicarbonate compound, carboxylic acid compound, lactone compound, lactam compound, cyclic acid anhydride, acid-base complex, acid-base-alcoholic complex, mercapto compound, or a combination thereof in the etching solution. And when necessary, the etching process may be repeated. Furthermore, in the case of an etching solution that comprises an inorganic acid or base, the etching solution may be washed and removed using additional water or an organic solvent. For example, it is possible to perform a washing process once more to fill the residue conductive ink on the substrate surface into the grooves.

The dissolving and re-filling rate of the residue conductive ink composition may be adjusted depending on the ratio of the oxide and the compounds in the etching solution.

After dissolving the residue conductive metal ink composition with the etching solution, the dissolved residue conductive metal ink composition is leaded to the grooves so as to fill the grooves of the substrate with the dissolved residue conductive ink composition.

The method for leading the residue conductive metal ink composition to the grooves may desirably be performed by pushing the composition into the grooves with physical force.

There is no limitation to the method for pushing the dissolved residue conductive metal ink composition or to the managing element for pushing the dissolved residue conductive metal ink composition into the grooves, but a doctor blade or brush may be used. The brush is more desirable. The brush may reduce the physical force thereby preventing scratches from being formed on the substrate surface or loss of ink. That is, it is possible to improve the filling rate of the electrode surface without damaging the substrate surface and electrode.

Furthermore, the filling may be performed more than once in various methods, especially by using a doctor blade and brush together.

By pushing the dissolved residue conductive metal ink composition using a doctor blade or brush into the grooves, it is possible to fill the grooves of the substrate with the conductive metal ink composition and at the same time remove the metal material or organic material that is a component of the conductive metal ink composition remaining on the substrate surface.

Besides the above, in order to fill the grooves with the dissolved residue conductive metal ink composition, it is possible to use additional vibration, fluctuation, air, or a combination thereof.

At the step of filling the residue ink composition (S20), it is desirable to perform a drying step after managing the dissolved residue conductive metal ink composition on the substrate surface. The drying the conductive pattern may be performed at 22 to 600° C., more desirably at 80 to 400° C., but without limitation. The drying may be performed within a temperature range where the substrate will not be transformed depending on the type of the substrate.

From the dissolved residue conductive metal ink composition filled in the grooves, the etching solution will be volatilized, and thus a single layer pattern consisting of single material of the conductive metal ink composition will be formed in the grooves.

By the aforementioned step, an electrode pattern may be formed, and although there is no limitation to the shape of the electrode pattern, it is desirable that the electrode pattern has a mesh or honey comb shape, more desirably a mesh shape.

By dissolving the residue conductive metal ink composition remaining on the substrate surface by the etching solution and filling into the grooves through the aforementioned step of filling the residue ink composition (S20), it is possible to re-fill the grooves with the residue conductive metal ink composition, thereby improving the optical characteristics and the flatness of the electrode surface.

The step of filling the residue ink composition (S20) may be performed twice or more times to elaborately adjust the extent of filling with the conductive metal ink composition in the grooves.

In another embodiment of the method for forming an electrode pattern of the present invention, it is possible to form an electrode pattern through a first filling of an ink composition that includes preparing a substrate having grooves on its surface, and filling the grooves with a conductive metal ink composition; a first filling of a residue ink composition that includes filling the grooves with the residue conductive metal composition that remains on the surface of the substrate as the grooves are being filled with the conductive metal ink composition to form an electrode pattern; a second filling of an ink composition that includes filling the grooves with the conductive metal ink composition; and a second filling of a residue ink composition that includes filling the grooves with the residue conductive metal ink composition that remains on the surface as the grooves are being filled with the conductive metal ink composition to form an electrode pattern.

A sintering step may be performed after each of the ink composition filling step and the residue ink composition filling step, and by repeating the filling with the conductive metal ink composition and the filling with the residue conductive metal ink composition, it is possible to form a fine electrode pattern of low resistance.

Forming Conductive Layer (S30)

The step of forming a conductive material (S30) is a step of forming a conductive layer comprising a conductive material on the electrode pattern to produce a hybrid type transparent electrode.

This step (S30) may be performed after the step of filling the ink composition (S10), or the step of filling the residue ink composition (S20). When the conductive material is formed on the electrode pattern after filling of the residue conductive metal ink composition, it is possible to realize a transparent electrode with a high reliability.

The conductive material that may be formed on the electrode pattern may desirably be metal oxide, CNT, graphene or conductive polymer.

The metal oxide may be tin oxide, ITO (indium tin oxide), ATO (antimony tin oxide), IGO (indium gallium oxide), IZO (indium zinc oxide), or zinc oxide, and the conductive polymer may be PEDOT (poly(3,4-ethylenedioxythiophene)) or PSS: PEDOT (poly(4-styrenesulfonate):poly(3,4-ethylenedioxythiophene)).

The conductive material may be deposited to be patterned on the electrode pattern or directly printed thereon. The materials of the metal oxide may desirably be vacuum-sputtered in a target format or made into ink and then printed as a thin film coating composition.

The thickness of the conductive layer may desirably be 0.5 to 2.0 times the height of the groove, and more desirably 0.8 to 1.5 times the height of the groove.

More specifically, it is effective when the thickness of the conductive layer is 10 to 500 nm, and more desirably less than 150 nm. When the thickness of the conductive layer is less than 10 nm, improvement of optical characteristics is not significant, and the surface roughness will decrease thereby deteriorating easy contact between the electrodes. When the thickness of the conductive layer exceeds 150 nm, the flexibility of the transparent electrode will decrease significantly, making it difficult to be applied to various kinds of product.

Such a hybrid type transparent electrode film may be used in fields that require excellent interface characteristics between two electrodes and thus high conductivity and high reliability.

Hereinafter, the present invention will be explained in further detail with reference to FIG. 2.

Figure 2:
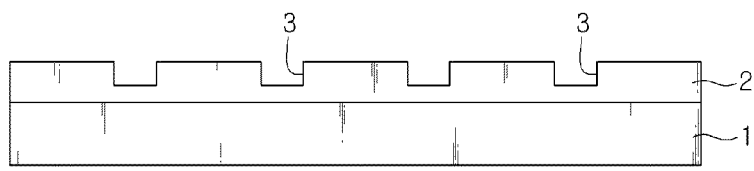
FIG. 2 are cross-sectional views sequentially showing a method for producing a hybrid transparent electrode according to another embodiment of the present invention.
Figure 2:
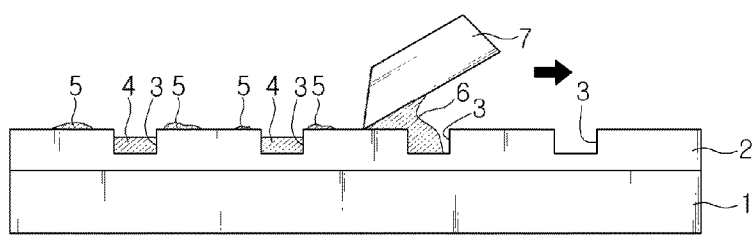
Figure 2:
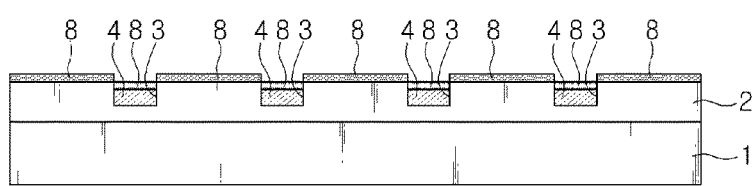
Figure 2:
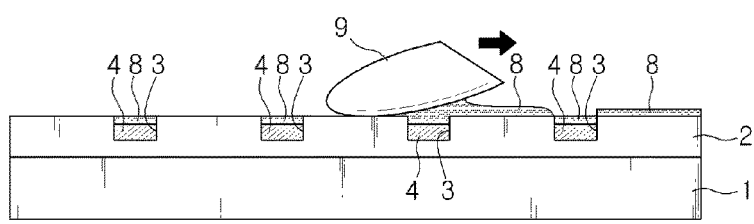
Figure 2:
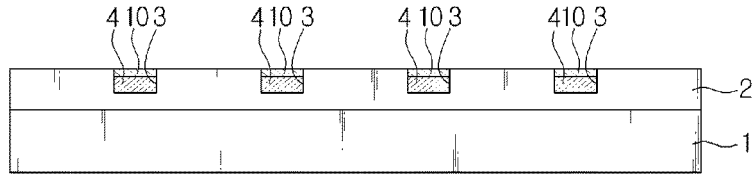
Figure 2:
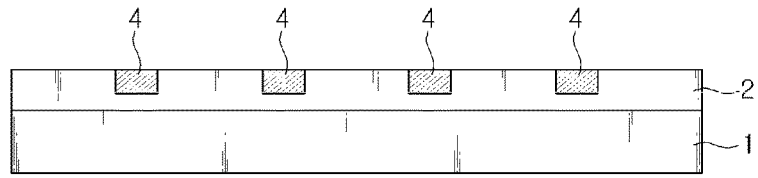
Figure 2:
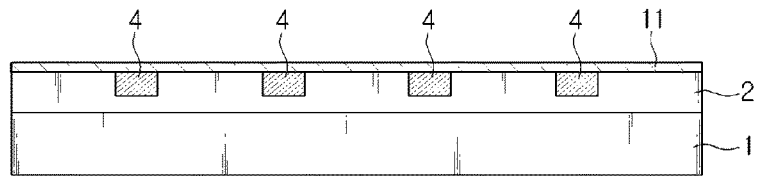
Figure 3:
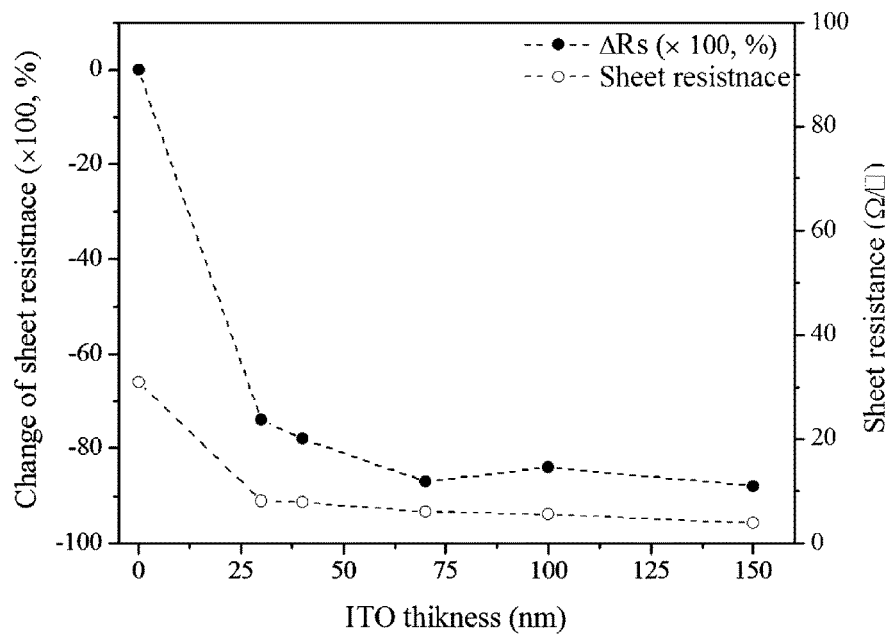
FIG. 3 is a graph illustrating the sheet resistance of a hybrid transparent electrode by a function of the thickness of the conductive layer.
Figure 4:
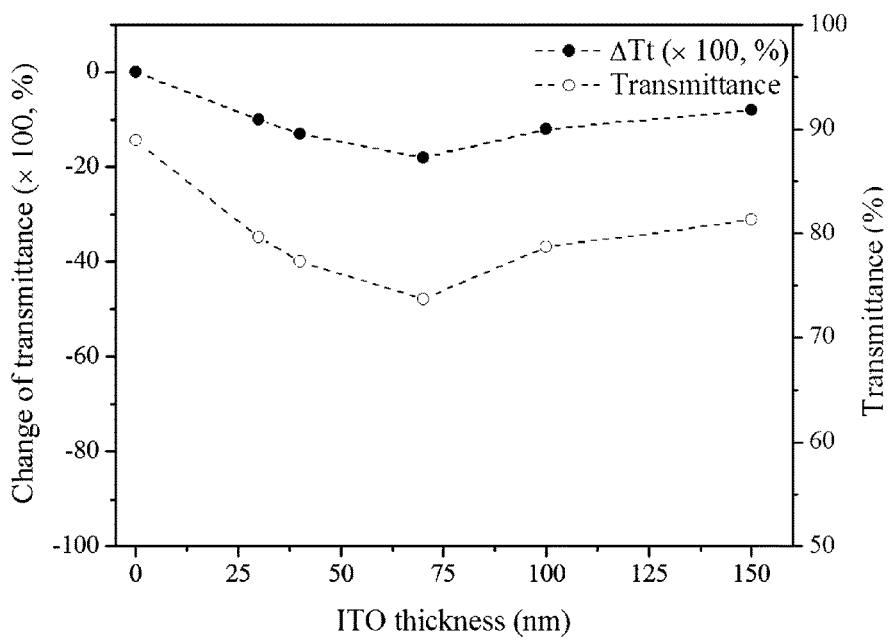
FIG. 4 is a graph illustrating the transmittance of a hybrid transparent electrode by a function of the thickness of the conductive layer.
Figure 5:
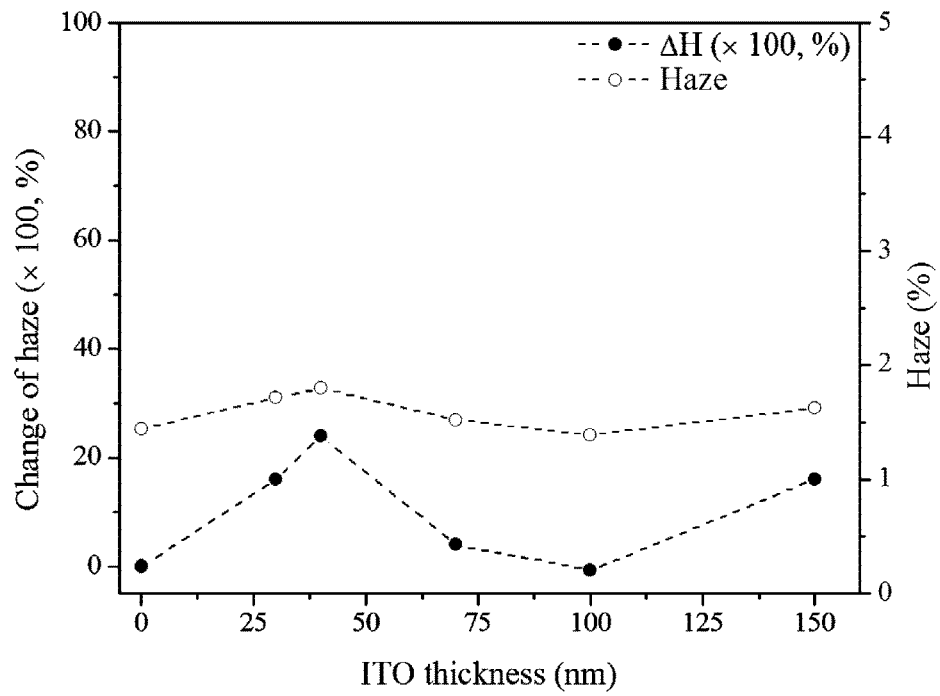
FIG. 5 is a graph illustrating the haze of a hybrid transparent electrode by a function of the thickness of the conductive layer.
Figure 6:
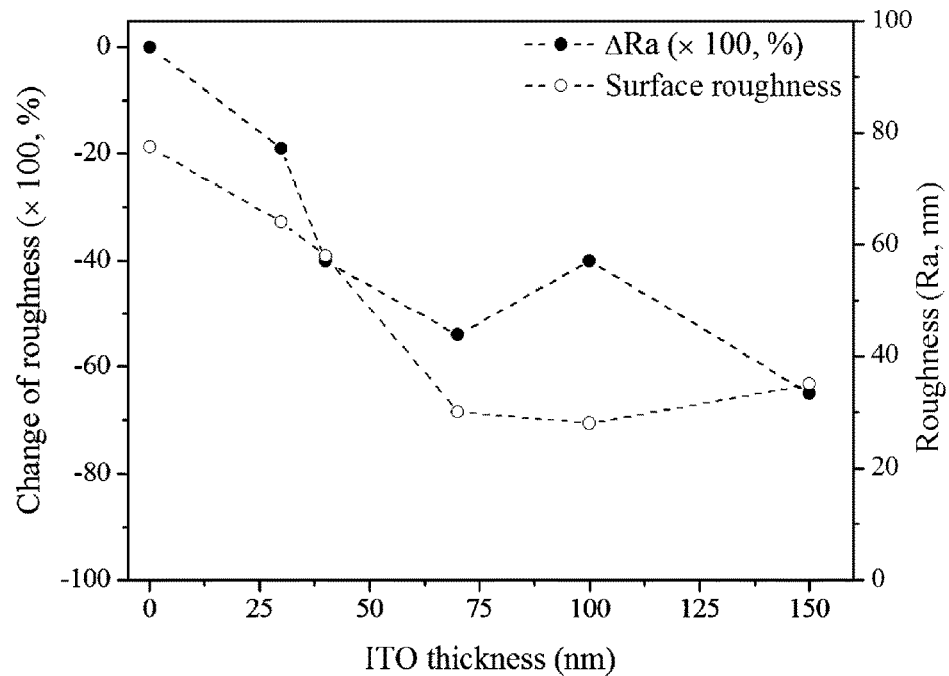
FIG. 6 is a graph illustrating the surface roughness (Ra) of a hybrid transparent electrode by a function of the thickness of the conductive layer.
Figure 7:
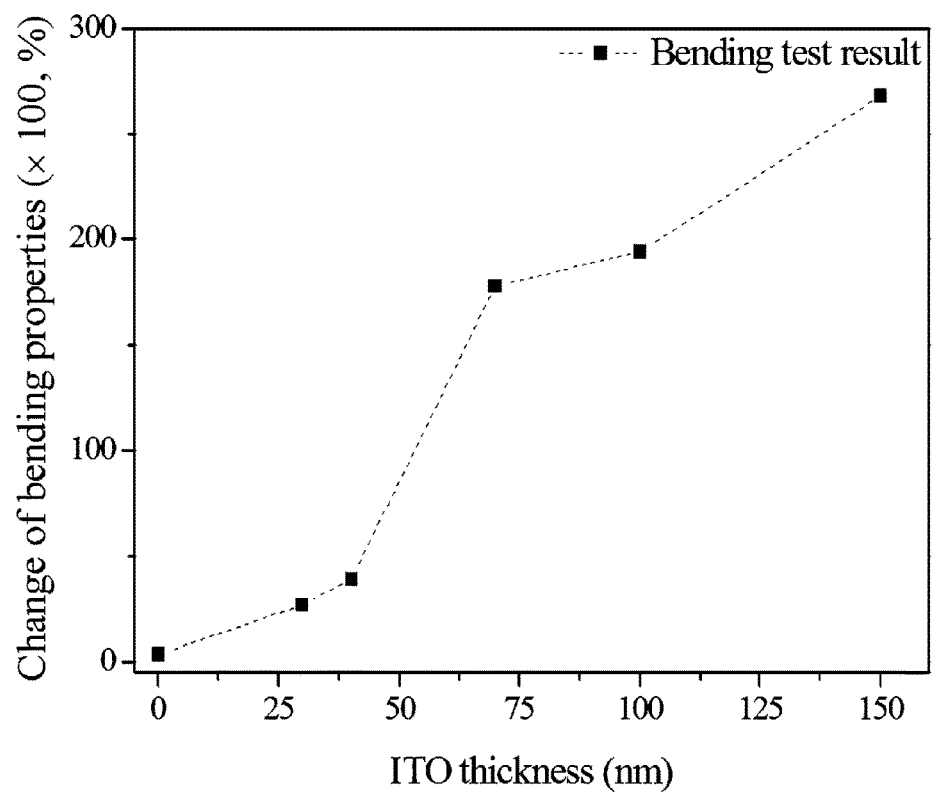
FIG. 7 is a graph illustrating the bending properties of a hybrid transparent electrode by a function of the thickness of the conductive layer.

FIG. 2 is cross-sectional views sequentially illustrating a method for producing a hybrid transparent electrode according to an embodiment of the present invention.

As can be seen from FIG. 2(a), a film 2 is formed on a substrate 1, and grooves 3 having square side cross-sections are formed on the film 2. The shape of the grooves 3 is not limited to a square, and thus various shapes of grooves may be formed in combination. The groove 3 may have a thickness that is smaller than the thickness of the film 2.

The upper surface of the film 2 may be hydrophobic-treated before the grooves 3 are formed, thereby facilitating treating the conductive metal ink composition to be explained hereinafter. Such a hydrophobic treatment on the upper surface may be performed by plasma-treating the upper surface of the film, for example.

In FIG. 2(b), after applying the conductive metal ink composition 6 on the film 2, the grooves 3 are filled with the conductive metal ink composition 6. By using a squeeze, the doctor blade 7 as illustrated in the drawing, it is possible to push the surface of the film 2 to fill the grooves 3 with the conductive metal ink composition 6.

Examples of methods for applying the conductive metal ink composition 6 are not limited to using the doctor blade 7, and thus an inkjet method, flat panel screen method, spin coating method, bar coater method, roll coating method, flow coating method, dispensing, gravure printing method or flexo printing method may be used. The conductive metal ink composition 6 may be applied more than once, and in some cases numerous times.

The conductive metal ink composition 4 filled in the grooves 3 by the aforementioned method may have a same or smaller depth than the groove.

Next, as illustrated in FIG. 2(c), an etching solution 8 is applied on the film 2. The etching solution 8 dissolves the residue conductive metal ink composition 5 on the surface of the film 2 surface that inevitably remains after the conductive metal ink composition 6 has been filled in FIG. 2b.

The etching solution 8 may be treated to have hydrophilic properties to facilitate the residue conductive metal ink composition 5 filling the grooves 3 subsequently. The etching solution may desirably comprise an ammonium carbamate compound, ammonium carbonate compound, ammonium bicarbonate compound, carboxylic acid compound, lactone compound, lactam compound, cyclic acid anhydride compound, acid-base complex compound, acid-base-alcoholic complex, or mercapto compound. In the case where the etching solution comprises an ammonium carbamate compound, ammonium carbonate compound, or ammonium bicarbonate compound, it is desirable to adjust the extent of hydrophilic properties of the etching solution by adjusting the carbon number of the ammonium carbamate compound, ammonium carbonate compound, or ammonium bicarbonate compound.

The method for applying the etching solution 8 may be a method commonly used in the related field, but desirably a roll coating, flow coating, gravure printing or flexo printing method.

Then, as can be seen from FIG. 2(d), the dissolved residue conductive metal ink composition is pushed into the grooves 3. For this purpose, a squeeze may be used, in the drawing, a brush 9 was used. This may be performed more than once, and various kinds of squeezes may be used in combinations.

Herein, if the surface of the film 2 is treated to have hydrophobic characteristics, the grooves 3 may be filled with the conductive metal ink composition 6 more easily.

When the grooves 3 are filled with the dissolved residue conductive metal ink composition, as can be seen from FIG. 2(e), the dissolved residue conductive metal ink composition is laminated on the conductive metal ink composition 4 of FIG. 2b.

In FIG. 2(e), the dissolved residue conductive metal ink composition comprises an etching solution, and thus the layers are differentiated. The etching solution is removed through a subsequent process of drying or sintering, thereby forming a single layered conductive pattern consisting of one kind of ink composition as can be seen from FIG. 2(f).

As can be seen from FIG. 2(g), by depositing or printing a conductive material such as ITO, AZO, CNT, graphene, or conductive polymer on the fine electrode pattern 4 to form a conductive layer, a hybrid type transparent electrode may be produced.

Hereinafter, the present invention will be explained in more detail based on examples, but without limitation.

PREPARATION EXAMPLES

Preparation Example 1

27.98 g of conductive paste (Inktec) and 0.45 g of terpineol were mixed with 1.57 g of coating ink (Inktec), and then stirred for 6 minutes at 1000 rpm using a paste mixer (Daewhatech) so as to produce a conductive metal ink composition.

Preparation Example 2

10.0 g of isobutylcarbamate, 85.5 g of isobutylamine, and 2.0 g of 95% solution of 2-amino-2-methyl-1-propanol were added, and then 2.5 g of hydrogen peroxide was slowly added, and then stirred for 5 hours so as to produce an etching solution.

EXAMPLES

Example 1

The conductive metal ink of Preparation Example 1 was applied on a nonconductive pattern film and then filling pattern grooves with the ink by blading once using a metal blade. Then, the ink was applied again, and the blading was repeated 5 times, and then sintering was performed for 1 minute at 120° C. Then, the etching solution of Preparation Example 2 was applied on the filled film, and then remaining ink was pushed into the grooves using a brush, and sintering was performed for 1 minute at 120° C. so as to form an electrode pattern. ITO was applied on the electrode pattern in a thickness of 30 nm using a sputter.

Example 2

The conductive metal ink of Preparation Example 1 was applied on a nonconductive pattern film and then filling pattern grooves with the ink by blading once using a metal blade. Then, the ink was applied again, and the blading was repeated 5 times, and then sintering was performed for 1 minute at 120° C. Then, the etching solution of Preparation Example 2 was applied on the filled film, and then remaining ink was pushed into the grooves using a brush, and sintering was performed for 1 minute at 120° C. so as to form an electrode pattern. ITO was applied on the electrode pattern in a thickness of 40 nm using a sputter.

Example 3

The conductive metal ink of Preparation Example 1 was applied on a nonconductive pattern film and then filling pattern grooves with the ink by blading once using a metal blade. Then, the ink was applied again, and the blading was repeated 5 times, and then sintering was performed for 1 minute at 120° C. Then, the etching solution of Preparation Example 2 was applied on the filled film, and then remaining ink was pushed into the grooves using a brush, and sintering was performed for 1 minute at 120° C. so as to form an electrode pattern. ITO was applied on the electrode pattern in a thickness of 70 nm using a sputter.

Example 4

The conductive metal ink of Preparation Example 1 was applied on a nonconductive pattern film and then filling pattern grooves with the ink by blading once using a metal blade. Then, the ink was applied again, and the blading was repeated 5 times, and then sintering was performed for 1 minute at 120° C. Then, the etching solution of Preparation Example 2 was applied on the filled film, and then remaining ink was pushed into the grooves using a brush, and sintering was performed for 1 minute at 120° C. so as to form an electrode pattern. ITO was applied on the electrode pattern in a thickness of 100 nm using a sputter.

Example 5

The conductive metal ink of Preparation Example 1 was applied on a nonconductive pattern film and then filling pattern grooves with the ink by blading once using a metal blade. Then, the ink was applied again, and the blading was repeated 5 times, and then sintering was performed for 1 minute at 120° C. Then, the etching solution of Preparation Example 2 was applied on the filled film, and then remaining ink was pushed into the grooves using a brush, and sintering was performed for 1 minute at 120° C. so as to form an electrode pattern. ITO was applied on the electrode pattern in a thickness of 150 nm using a sputter.

COMPARATIVE EXAMPLE

Comparative Example 1

The conductive metal ink of Preparation Example 1 was applied on a nonconductive pattern film and then filling pattern grooves with the ink by blading once using a metal blade. Then, the ink was applied again, and the blading was repeated 5 times, and then sintering was performed for 1 minute at 120° C. Then, the etching solution of Preparation Example 2 was applied on the filled film, and then remaining ink was pushed into the grooves using a brush, and sintering was performed for 1 minute at 120° C. so as to form an electrode pattern.

Comparative Example 2

The conductive metal ink of Preparation Example 1 was applied on a nonconductive pattern film and then filling pattern grooves with the ink by blading once using a metal blade. Then, the ink was applied again, and the blading was repeated 5 times, and then sintering was performed for 1 minute at 120° C. Then, without etching, sintering was performed for 1 minute at 120° C. so as to form an electrode pattern. ITO of a thickness of 100 nm was applied on the electrode pattern using a sputter.

The sheet resistance, transmittance, haze, and surface roughness (Ra) according to Examples 1 to 5 and Comparative Example 1 are as stated in table 1 below.

TABLE 1

| | Sheet resistance ($\Omega/\square$) | Transmittance (%) | Haze (%) | Surface Roughness (nm) |
|---|---|---|---|---|
| Example 1 | 8.1 | 79.6 | 1.71 | 64 |
| Example 2 | 7.8 | 77.3 | 1.80 | 58 |
| Example 3 | 6.0 | 73.7 | 1.52 | 30 |
| Example 4 | 5.5 | 78.7 | 1.39 | 28 |
| Example 5 | 3.9 | 81.3 | 1.62 | 35 |
| Comparative Example 1 | 47 | 88.3 | 1.40 | 100 |

As can be seen from table 1 above, a hybrid transparent electrode produced by the method of the present invention has a significantly low sheet resistance compared to the electrode pattern (Comparative Example 1) that is without a conductive layer, and thus one can see that the hybrid transparent electrode produced by the method of the present invention has excellent electrical conductivity.

Furthermore, the transmittance and haze of the Examples of the present invention are rather low compared to Comparative Example 1, but there is no problem with those transmittance and haze to be used as a film for transparent electrodes, and thus it is possible to realize such a transparent electrode.

Especially, the surface roughness of the transparent electrode films of the present inventions is at least 28 nm, which is a very uniform surface roughness, whereas in Comparative Example 1, the surface roughness is 100 nm, and thus it is difficult to form a uniform surface, showing that the extent of contact between electrodes is significantly deteriorated.

The sheet resistance, transmittance, haze, and surface roughness (Ra) according to Example 4 and Comparative Example 2 are as stated in table 2 below. For each item, data was measured before and after applying ITO, and the change rates of before and after applying ITO were stated as well.

TABLE 2

| | Sheet resistance ($\Omega/\square$) | | | Transmittance (%) | | | Haze (%) | | | Surface roughness (nm) | | |
|---|---|---|---|---|---|---|---|---|---|---|---|---|
| | ITO depositon | | Change rate | ITO depositon | | Change rate | ITO depositon | | Change rate | ITO depositon | | Change rate |
| No.* | before | after | (%) | before | after | (%) | before | after | (%) | before | after | (%) |
| 1 | 34 | 5.5 | −84 | 89.2 | 78.7 | −12 | 1.40 | 1.39 | −0.7 | 47 | 28 | −40 |
| 2 | 3.8 | 1.7 | −55 | 0.2 | 0.3 | 50 | 11.11 | 10.00 | −10 | 22.9 | 18.0 | −21 |

Note:
*1: Example 4 2: Comparative example 2

Table 3 below shows the sheet resistance, transmittance, haze, and surface roughness (Ra) measured before and after etching before applying ITO according to Example 4, in order to understand the effects of etching by the etching solution in a hybrid transparent electrode. are as stated in table 3 below. The change rates of before and after applying ITO were stated as well.

TABLE 3

| | Sheet resistance (Ω/□) | | | Transmittance (%) | | | Haze (%) | | | Surface roughness (nm) | | |
|---|---|---|---|---|---|---|---|---|---|---|---|---|
| | etching | | Change rate | etching | | Change rate | etching | | Change rate | etching | | Change rate |
| No.* | before | after | (%) | before | after | (%) | before | after | (%) | before | after | (%) |
| 1 | 3.8 | 31 | 715 | 0.2 | 88.8 | 44300 | 11.11 | 1.48 | −87 | 23 | 48 | 109 |

Note:
*1: Example 4

Table 4 below shows reduction rates (%) of efficiencies compared to initial efficiencies after conducting a bending test of bending a hybrid transparent electrode 3000 times using a bending tester having a diameter of 10 mm in order to understand the bending property of the hybrid transparent electrode of the present invention.

TABLE 4

| | Bending property (Ω, 3000 times, 10 mm) | | |
|---|---|---|---|
| | Before($R_0$) | After(R) | [(R − $R_0$)/$R_0$] × 100 (%) |
| Example 1 | 6.3 | 8.0 | 27 |
| Example 2 | 6.6 | 9.2 | 39 |
| Example 3 | 6.7 | 18.6 | 178 |
| Example 4 | 4.9 | 18.5 | 194 |
| Example 5 | 4.0 | 14.6 | 268 |

Having been subjected to the bending test, the transparent electrode produced according to the examples of the present invention showed performance stability compared to convention hybrid electrodes.

That is, the transparent electrodes of the present invention have excellent mechanical property and bending property, and may thus be suitably applied to flexible displays with durability.

FIGS. 3 to 7 are graphs showing measurements of the sheet resistance, transmittance, haze, surface roughness, and bending property according to thickness of a conductive layer. In these graphs, ITO was used as the conductive material of the conductive layer.

Figure 8:
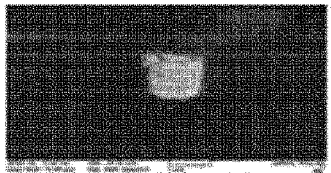
FIG. 8 is an SEM image of a cross-sectional view of a transparent electrode of examples and comparative example.
Figure 8:
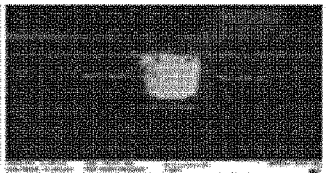
Figure 8:
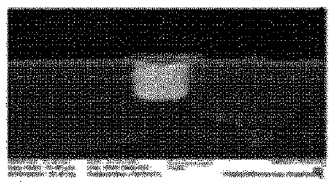
Figure 8:
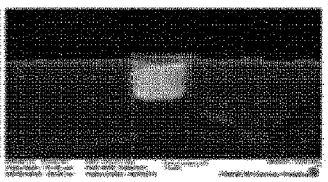
Figure 8:
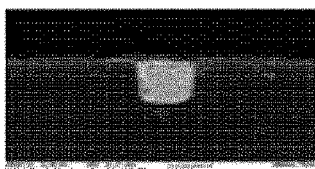
Figure 8:
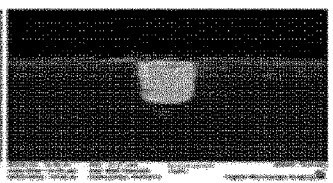
Figure 8:
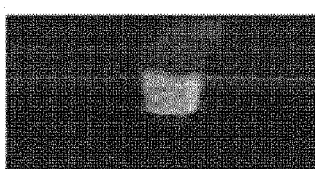
Figure 8:
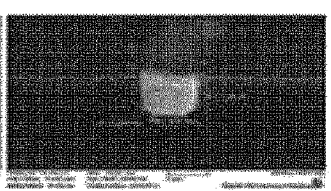
Figure 8:
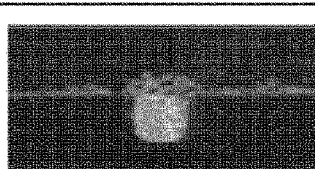
Figure 8:
Figure 8:
Figure 8:

FIG. 8 shows SEM images of a cross-sectional views of hybrid transparent electrodes produced according to the examples and the comparative example.

While this disclosure includes desirable embodiments of the present invention various changes in form and details may be made in these embodiments without departing from the spirit and scope of the claims and their equivalents. Therefore, the aforementioned description of the present invention does not limit the scope of the present invention defined by the limitations of the claims.

INDUSTRIAL APPLICABILITY

According to the method for producing a hybrid transparent electrode according to the present invention, it is possible to provide a hybrid type transparent electrode with a conductive layer formed on a fine metal electrode pattern having excellent surface characteristics and electrical characteristics.

What is claimed is:

1. A method for producing a hybrid transparent electrode, the method comprising:
   filling grooves of a substrate with a conductive metal ink composition;
   filling the grooves with residue conductive metal ink composition that remains on a surface of the substrate as the grooves are being filled with the conductive metal ink composition to form an electrode pattern; and
   forming a conductive layer including a conductive material on the electrode pattern.

2. The method according to claim 1, wherein the conductive metal ink composition comprises at least one of a metal complex compound, metal precursor, spherical metal particles, metal flakes, nano particles and nano wires.

3. The method according to claim 1, wherein the filling the grooves with the conductive metal ink composition is performed by an inkjet method, flat panel screen method, screen coating method, bar coater method, roll coating method, flow coating method, doctor blade, dispensing, gravure printing method or flexo printing method.

4. The method according to claim 1, wherein the filling the groove with the residue conductive metal ink composition includes dissolving the residue conductive metal ink composition that remains on the surface of the substrate as the grooves are being filled with the conductive metal ink composition by an etching solution so that the grooves are filled with the dissolved residue conductive metal ink composition.

5. The method according to claim 4, wherein the etching solution is applied on the substrate surface and dissolves the residue conductive metal ink composition.

6. The method according to claim 5, wherein the etching solution is applied by a flat panel screen method, spin coating method, roll coating method, flow coating method, doctor blade, gravure printing method, or flexo printing method.

7. The method according to claim 4, wherein the etching solution comprises at least one of an ammonium carbamate compound, ammonium carbonate compound, ammonium bicarbonate compound, carboxylic acid compound, lactone compound, lactam compound, cyclic acid anhydride compound, acid-base complex, acid-base-alcoholic complex, and mercapto compound, and an oxidizing agent.

8. The method according to claim 4, wherein the grooves are filled with the residue conductive metal ink composition by pushing the residue conductive metal ink composition dissolved by the etching solution into the grooves.

9. The method according to claim 4, wherein the residue conductive metal ink composition dissolved by the etching solution is pushed into the groove using a doctor blade or brush.

10. The method according to claim 1, wherein the conductive material is a metal oxide, CNT, graphene, or conductive polymer.

11. The method according to claim 1, wherein the conductive layer is formed by depositing or printing the conductive material on the electron pattern.

12. The method according to claim 1, wherein the thickness of the conductive layer is 0.5 to 2.0 times the height of the groove.

13. A method for producing a hybrid transparent electrode, the method comprising:
   treating a surface of a substrate having grooves on its surface, and treating the surface of the substrate to have a hydrophobic property;
   filling the grooves with a conductive metal ink composition;
   filling the grooves with a residue conductive metal ink composition that remains on the surface of the substrate as the grooves are being filled with the conductive metal ink composition to form an electrode pattern; and
   forming a conductive layer including a conductive material on the electrode pattern.

14. The method according to claim 13, wherein the conductive metal ink composition comprises at least one of a metal complex compound, metal precursor, spherical metal particles, metal flakes, nano particles and nano wires.

15. The method according to claim 13, wherein the filling the grooves with the residue conductive metal ink composition includes dissolving the residue conductive metal ink composition that remains on the surface of the substrate as the grooves are being filled with the conductive metal ink composition by an etching solution and filling the grooves with the dissolved residue conductive metal ink composition.

16. The method according to claim 15, wherein the grooves are filled with the residue conductive metal ink composition by pushing the residue conductive metal ink composition dissolved by the etching solution into the grooves using a doctor blade or brush.

17. The method according to claim 13, wherein the conductive layer is formed by depositing or printing a metal oxide, CNT, graphene, or conductive polymer on the electron pattern.

18. A method for producing a hybrid transparent electrode, the method comprising:
   a first filling with a conductive metal ink composition that includes preparing a substrate having grooves on its surface, and filling the grooves with the conductive metal ink composition;
   a first filling with a residue conductive metal ink composition that includes filling the grooves with the residue conductive metal ink composition that remains on the surface of the substrate as the grooves are being filled with the conductive metal ink composition to form an electrode pattern;
   a second filling with a conductive metal ink composition that includes filling the grooves with the conductive metal ink composition;
   a second filling with a residue conductive metal ink composition that includes filling the grooves with the residue conductive metal ink composition that remains on the surface of the substrate as the grooves are being filled with the conductive metal ink composition to form an electrode pattern; and
   forming a conductive layer comprising a conductive material on the electrode pattern.

19. The method according to claim 18, wherein the conductive metal ink composition comprises at least one of a metal complex compound, metal precursor, spherical metal particles, metal flakes, nano particles and nano wires.

20. The method according to claim 19, wherein the metal precursor is $M_nX$, M being one of Ag, Au, Cu, Ni, Co, Pd, Ti, V, Mn, Fe, Cr, Zr, Nb, Mo, W, Ru, Cd, Ta, Re, Os, Ir, Al, Ga, Ge, In, Sn, Sb, Pb and Bi, n being an integer of 1 to 10, X being one of oxygen, sulfur, halogen, cyano, cyanate, carbonate, nitrate, sulfate, phosphate, thiocyanate, chlorate, perchlorate, tetrafluoroborate, acetylacetonate, mercapto, amide, alkoxide, and carboxylate.

21. The method according to claim 18, wherein the conductive layer is formed by depositing or printing the conductive material on the electron pattern.

22. The method according to claim 18, wherein the conductive layer has a thickness of 10 to 500 nm.

23. A method for producing a hybrid transparent electrode, the method comprising:
   filling grooves with a conductive metal ink composition after preparing a substrate having the grooves on its surface;
   filling the grooves with a residue conductive metal ink composition that remains on a surface of the substrate as the grooves are being filled with the conductive metal ink composition to form an electrode pattern;
   sintering the electrode pattern at 50 to 200° C.; and
   forming a conductive layer comprising a conductive material on the electrode pattern.

24. The method according to claim 23, wherein the step of filling the grooves with residue conductive metal ink composition is repeated twice or more times.

25. The method according to claim 23, wherein the filling the grooves with the residue conductive metal ink composition includes dissolving the residue conductive metal ink composition that remains on the surface of the substrate as the grooves are being filled with the conductive metal ink composition by an etching solution so that the grooves are filled with the dissolved residue conductive metal ink composition.

26. The method according to claim 25, wherein the etching solution is applied on the entire surface of the substrate by a flat panel screen method, spin coating method, roll coating method, flow coating method, doctor blade, gravure printing method, or flexo printing method to dissolve the residue conductive metal ink composition.

* * * * *

UNITED STATES PATENT AND TRADEMARK OFFICE
CERTIFICATE OF CORRECTION

PATENT NO. : 9,524,046 B2
APPLICATION NO. : 14/891448
DATED : December 20, 2016
INVENTOR(S) : Chung et al.

It is certified that error appears in the above-identified patent and that said Letters Patent is hereby corrected as shown below:

Column 10, Line 2, please delete "5-valerolactone" and replace with --δ-valerolactone--

Signed and Sealed this
Tenth Day of April, 2018

Andrei Iancu
*Director of the United States Patent and Trademark Office*